(12) United States Patent
Feng

(10) Patent No.: US 10,712,011 B2
(45) Date of Patent: Jul. 14, 2020

(54) MULTI-FUNCTIONAL FRAME FOR OVEN

(71) Applicant: Fudu Feng, Jiangsu (CN)

(72) Inventor: Fudu Feng, Jiangsu (CN)

(*) Notice: Subject to any disclaimer, the term of this patent is extended or adjusted under 35 U.S.C. 154(b) by 58 days.

(21) Appl. No.: 15/928,115

(22) Filed: Mar. 22, 2018

(65) Prior Publication Data
US 2019/0285280 A1 Sep. 19, 2019

(30) Foreign Application Priority Data

Mar. 13, 2018 (CN) .......................... 2018 1 0205591

(51) Int. Cl.
| | | |
|---|---|---|
| *F24B 1/20* | (2006.01) | |
| *B62B 3/02* | (2006.01) | |
| *B62B 5/06* | (2006.01) | |
| *B62B 5/00* | (2006.01) | |

(52) U.S. Cl.
CPC .............. *F24B 1/205* (2013.01); *B62B 3/022* (2013.01); *B62B 5/0013* (2013.01); *B62B 5/061* (2013.01); *F24B 1/207* (2013.01); *B62B 2205/003* (2013.01); *B62B 2205/06* (2013.01)

(58) Field of Classification Search
CPC .. F24B 1/205; F24B 1/207; F24C 1/16; F24C 3/14; F24C 5/20; A21B 1/52
See application file for complete search history.

(56) References Cited

U.S. PATENT DOCUMENTS

| | | | |
|---|---|---|---|
| 7,249,771 B1* | 7/2007 | Brennan | A47J 37/0704 280/35 |
| 9,096,247 B2* | 8/2015 | Witzel | B62B 1/008 |
| 9,644,378 B2* | 5/2017 | Knox | E04G 1/22 |
| 2008/0098902 A1* | 5/2008 | Mansfield | A47J 37/0786 99/339 |
| 2018/0110375 A1* | 4/2018 | Hansen | A47J 43/20 |
| 2019/0053667 A1* | 2/2019 | Jensen | A47J 37/0763 |

* cited by examiner

*Primary Examiner* — David J Laux

(57) ABSTRACT

The disclosure claims a multi-functional frame for an oven. The multi-functional frame for the oven mainly comprises a base frame, a platform, a pedal, a handle and a protective cover, wherein the pedal is arranged at the lower end of the base frame, the platform is arranged at the upper end of the base frame, the handle is installed on the side wall plate of the platform, and the protective cover is installed at the upper end of the platform. The multi-functional frame for the oven is reasonable and simple in structure. The multi-functional frame for the oven has characteristics of low packaging and transportation costs, convenient and easy use and assembly for a user, and time saving, labor saving and worry saving when use.

8 Claims, 12 Drawing Sheets

MULTI-FUNCTIONAL FRAME FOR OVEN

BACKGROUND OF THE INVENTION

1. Field of the Invention

The disclosure relates to a technical field of a support frame, and more particularly to a multi-functional frame for an oven.

2. Description of the Related Art

A support frame is an essential bracket when using an oven. When the support frame of a traditional oven is packaged, all components are basically packaged after being disassembled, which brings a lot of troubles to a user when assembling the oven, and meanwhile, wasting a lot of assembly times and a lot of manpower and material resources. Moreover, due to misuse of fillers when packaging and transporting, different degrees of losses of the oven during transportation are often occurred, thereby affecting a beautiful appearance and a service life of the oven.

Therefore, it is an urgent need to develop a multi-functional frame for an oven to solve the above problem.

SUMMARY OF THE INVENTION

To solve the problem, the disclosure claims a multi-functional frame for an oven. While packaging and transportation, the oven and the multi-functional frame for the oven can be combined and packaged, thereby saving an assembly time of the oven for a user when use, and avoiding the damage of the oven in transit. A multi-functional frame for an oven, comprising: cross beams (1), longitudinal beams (2), a caster (3), a pedal I (4-1), a pedal II (4-2), a diagonal bracing (5), a bolt (6), a connecting piece I (7-1), a connecting piece II (7-2), a hydraulic rod (8-1), a hydraulic cylinder (8-2), a lock rod (9), a connecting rod I (10), a connecting rod II (11), a bracket I (12-1), a bracket I (12-2), a platform (13), a handle I (14-1), a handle II (14-2), a handle III (14-3), a handle IV (14-4), a groove (15), a connecting column I (16-1), a connecting column II (16-2), a connecting column HI (16-3), a connecting column IV (16-4), a protective cover (17), a connecting sleeve (18), reinforcing battens (19), a shelving bar (20) and a functional groove (21), wherein the two cross beams (1) and the two longitudinal beams, (2) are connected to each other end to end, to form a base frame; the caster (3), the pedal I (4-1) and the pedal II (4-2) are installed at the bottom of the base frame; two cross-linked diagonal bracings (5) are installed at the upper ends of the left and right sides of the base frame and are hinged through the bolt (6); the lock rod (9) is arranged at the rear end of the base frame; one end of the connecting piece I (7-1) and the connecting piece II (7-2) is connected to the diagonal bracing (5) respectively, and the other end thereof is fixed on the platform (13); one end of the hydraulic rod (8-1) is connected to the connecting rod I (10), and the other end thereof is connected to one end of the hydraulic cylinder (8-2), and the other end of the hydraulic cylinder (8-2) is fixed on the base frame; two ends of the connecting rod II (11) are respectively connected to the diagonal bracings (5) at two sides above the base frame; the bracket I (12-1) and the bracket II (12-2) which are cross-linked are installed at the bottom of the platform (13), the handle I (14-1) and the handle II (14-2) are arranged on the left side wall of the platform (13), the handle III (14-3) and the handle IV (14-4) are arranged on the right side wall of the platform (13), the groove (15) is formed at the central position of the platform (13), and the connecting column I (16-1), the connecting column II (16-2), the connecting column I (16-3) and the connecting column IV (16-4) are arranged on the surface of the platform (13); the connecting sleeve (18) is arranged at the bottom of the protective cover (17), and the protective cover (17) is nested above the connecting column I (16-1), the connecting column II (16-2), the connecting column III (16-3) and the connecting column IV (16-4) on the platform (13) through the connecting sleeve (18); the shelving bar (20) is placed on the top surface of the protective cover (17), and the functional groove (21) is formed on the shelving bar (20); and the upper ends of the four reinforcing battens (19) are fixedly connected to the platform (13), and the lower ends thereof are fixedly connected to the base frame.

Further, the multi-functional frame for the oven mainly comprises a base frame, a platform, a pedal, a handle and a protective cover, wherein the pedal is arranged at the lower end of the base frame, the platform is arranged at the upper end of the base frame, the handle is installed on the side wall plate of the platform, and the protective cover is installed at the upper end of the platform. The multi-functional frame for the oven is reasonable and simple in structure.

Further, the material of the cross beams (1), the longitudinal beams (2), the pedal I (4-1), the pedal II (4-2), the diagonal bracing (5), the bolt (6), the connecting piece I (7-1), the connecting piece II (7-2), the lock rod (9), the connecting rod I (10), the connecting rod II (11), the bracket I (12-1), the bracket II (12-2), the platform (13), the handle I (14-1), the handle II (14-2), the handle III (14-3), the handle IV (14-4), the connecting column I (16-1), the connecting column II (16-2), the connecting column III (16-3), the connecting column IV (16-4), the protective cover (17) and connecting sleeve (18) in the disclosure is iron or stainless steel.

Further, the cross beams (1) and the longitudinal beams (2) in the disclosure are "square tube" shaped or "circular tube" shaped.

Further, the pedal I (4-1) and the pedal II (4-2) in the disclosure are "U" shaped.

Further, the connecting piece I (7-1) and the connecting piece II (7-2) in the disclosure are "Y" shaped.

Further, the platform (13) is "cube" shaped or "cuboid" shaped or "cylinder" shaped.

Further, the handle I (14-1), the handle II (14-2), the handle III (14-3) and the handle IV (14-4) in the disclosure are flat "U" shaped.

Further, the groove (15) in the disclosure is flat "a" shaped.

A use method of the multi-functional frame for the oven comprises the following steps: packaging and transportation, and assembling;

Step I: packaging and transportation

1. Firstly, placing an oven body on the compressed multi-functional frame;

2. Secondly, installing a protective cover on the multi-functional frame after the oven body is placed;

3. Finally, putting the multi-functional frame that the oven body is placed and the protective cover is installed into a packing case, and transporting the same.

Step II: Assembling

1. When using the oven, a user firstly opens the packing case, and takes out the multi-functional frame for placing the oven;

2. Dismounting the protective cover installed on the multi-functional frame;

3. Two persons stand at both sides of the multi-functional frame respectively, wherein one person stamps on the pedal I (4-1) and holds the handle I (14-1) and the handle II (14-2) with both hands respectively, and the other person stamps on the pedal II (14-2) and holds the handle III (14-3) and the handle IV (14-4) with both hands respectively; and the two persons pull multi-functional frame up simultaneously to a maximum height, lock the lock rod (9), and install the reinforcing battens (19).

4. When installing a shelving platform on the right side of the multi-functional frame, the connecting sleeves (18) on two dismounted right legs of the protective cover are taken down respectively, and the two right legs are nested on the connecting column I (16-1) and the connecting column II (16-2) respectively; if the user wants to install the shelving platform on the left side of the multi-functional frame, similarly, the connecting sleeves (18) on two dismounted loft legs of the protective cover are taken down respectively, and the two left legs are nested on the connecting column II (16-3) and the connecting column IV (16-4) respectively; and if the user wants to install the shelving platform on the two sides of the multi-functional frame, the user only needs the manufacturer to prepare one more protective cover when purchasing the oven. Users who have purchased the oven separately in advance, now, only need to separately purchase the multi-functional frame which is also applicable to the oven, and when purchasing, the users only need to inform the manufacturer of size parameters of multi-functional frame series.

5. After the shelving bar is paved placed on the shelving platform, dishes to be baked can be placed on the shelving platform. If the user wants to place a small oven or other commodities on the shelving platform, the user only needs the manufacturer to open the functional groove (21) on the shelving bar when purchasing the multi-functional frame.

The disclosure has beneficial effects that:

The multi-functional frame for the oven has characteristics of low packaging and transportation costs, convenient and easy use and assembly for a user, and time saving, labor saving and worry saving when use.

A series of concepts with simplified forms is introduced in the summary of the disclosure, which is further elaborated in a specific embodiment. The summary of the disclosure does not mean trying to define key features and necessary technical features of the claimed technical solution, and even, does not mean trying to determine the protection scope of the claimed technical solution.

The advantages and features of the disclosure are elaborated in combination with the following description.

Figure 1:
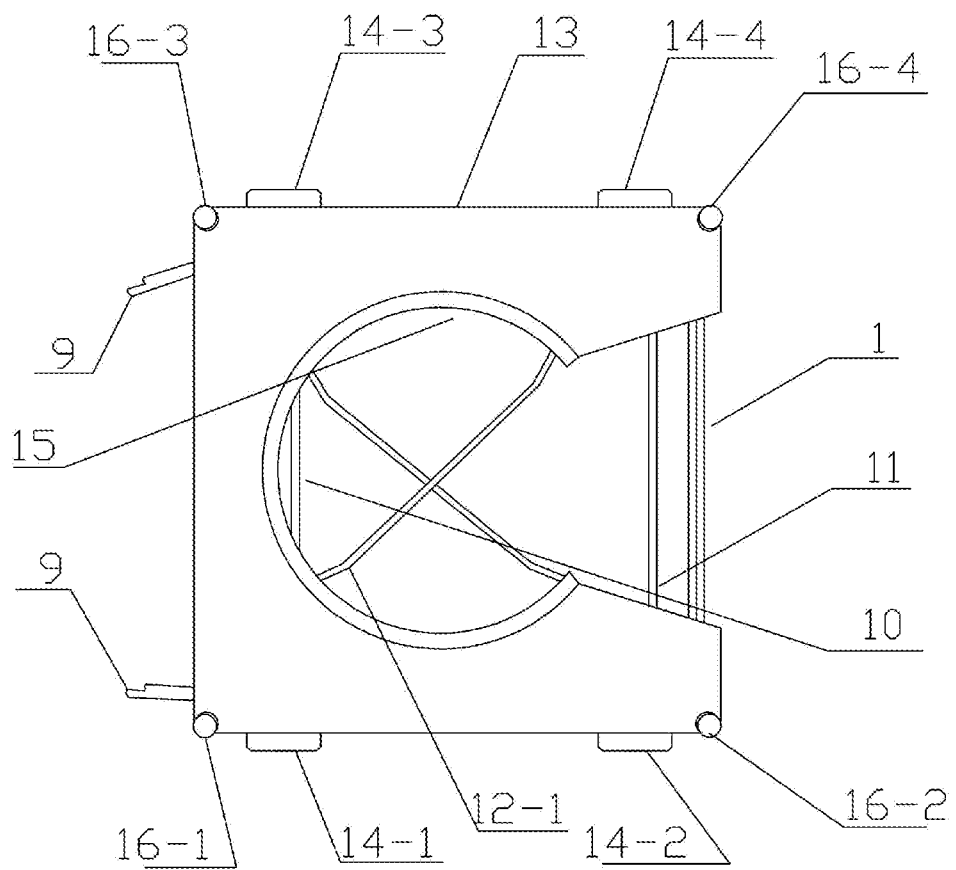
FIG. 1 and FIG. 2 are schematic diagrams after compressing according to the disclosure.

In which: 1. Cross beams 2. Longitudinal beams 3. Caster 4-1. Pedal I 4-2. Pedal II 5. Diagonal bracing 6. Bolt 7-1. Connecting piece I 7-2. Connecting piece II 8-1. Hydraulic rod 8-2. Hydraulic cylinder 9. Lock rod 10. Connecting rod I 11. Connecting rod II 12-1. Bracket I 12-2. Bracket II 13. Platform 14-1 Handle I 14-2. Handle II 14-3. Handle III 14-4. Handle IV 15. Groove 16-1 Connecting column I 16-2. Connecting column 16-3. Connecting column III 16-4. Connecting column IV 17. Protective cover 18. Connecting sleeve 19. Reinforcing battens 20. Shelving bar 21. Functional groove

DETAILED DESCRIPTION OF THE PREFERRED EMBODIMENTS

In the following description, a lot of specific details are given to provide more thorough understanding for the disclosure. However, it is apparent for those skilled in the art, and the disclosure can be implemented without one or more details. In other examples, some technical features known in the art are not described, so as to avoid mixing with the disclosure.

To understand the disclosure thoroughly, a detailed structure is proposed in description below. Apparently, the implementation of the disclosure is not limited to special details familiarized by those skilled in the art. Better embodiments of the disclosure are elaborated below, and however, in addition to the detailed description, the disclosure further has other embodiments.

Detailed description is made below to embodiments of the disclosure.

Figure 2:
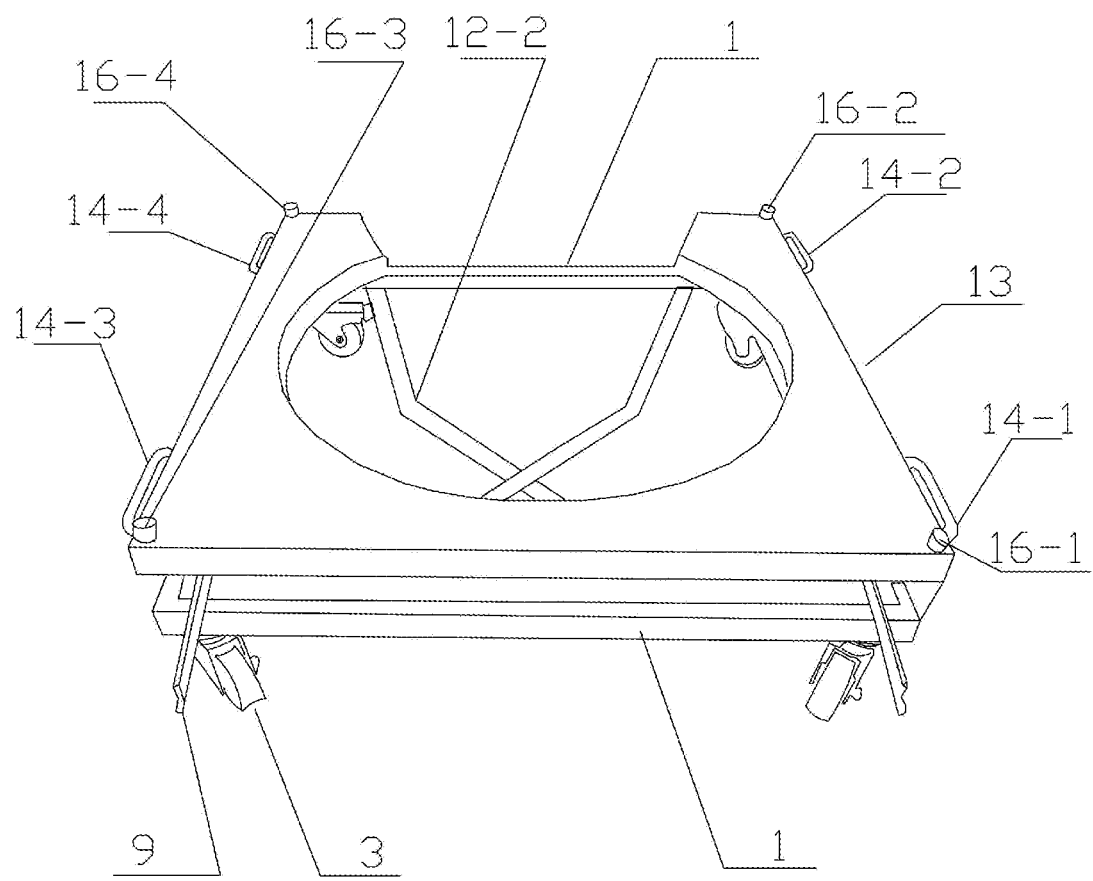
Figure 3:
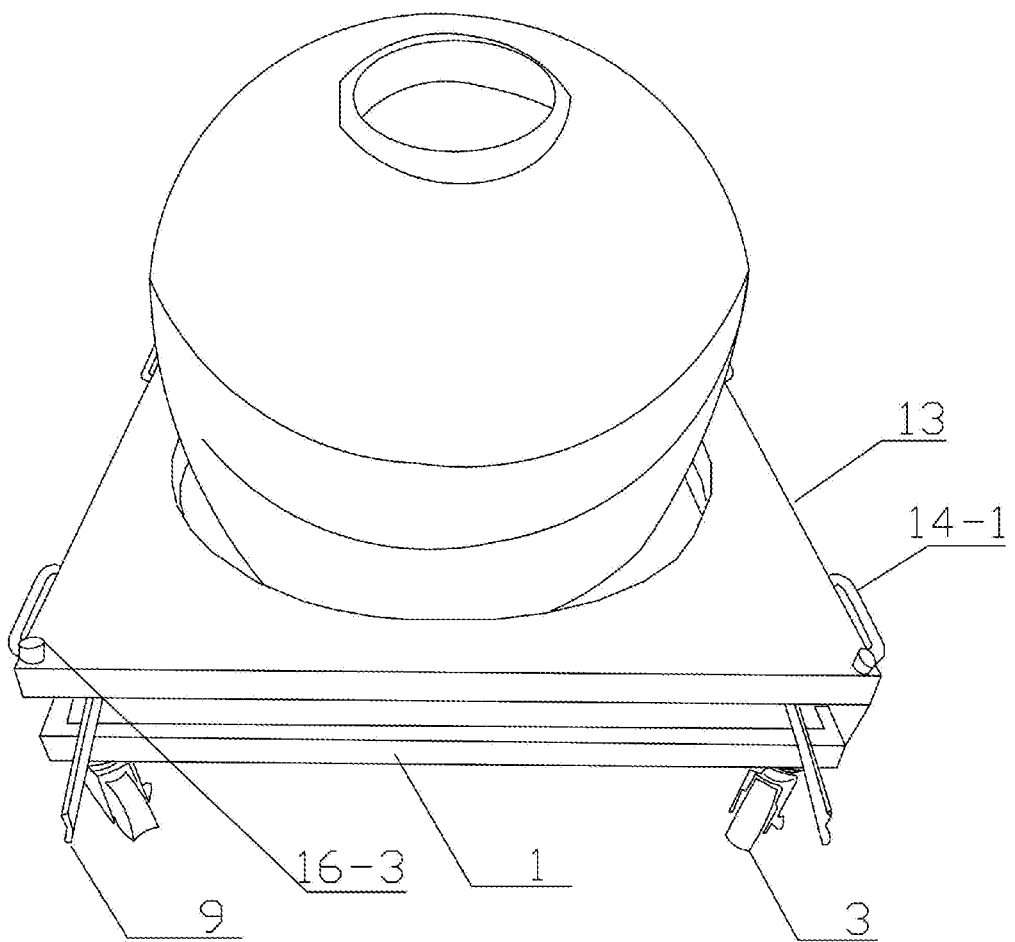
FIG. 3 is a schematic diagram for placing an oven body after compressing according to the disclosure.
Figure 4:
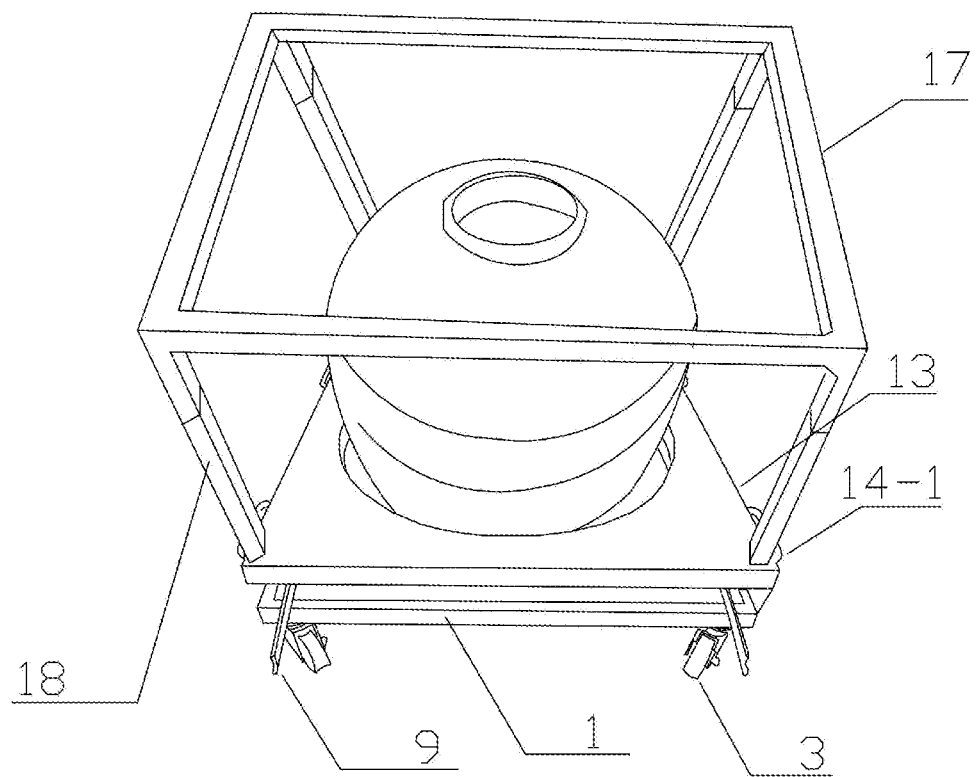
FIG. 4 is a schematic diagram for placing an oven body and installing a protective cover after compressing according to the disclosure.
Figure 5:
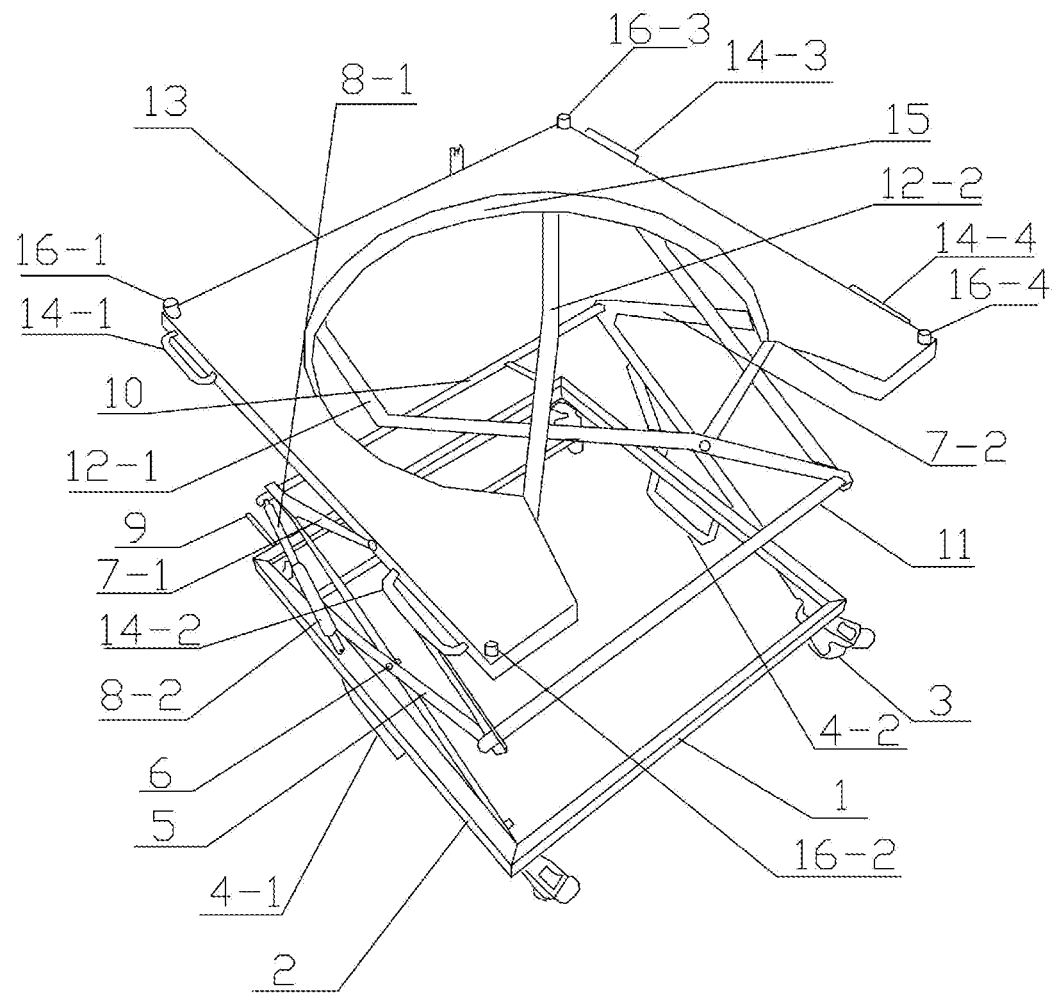
FIG. 5 is a schematic diagram of a stereoscopic structure after unfolding according to the disclosure.
Figure 6:
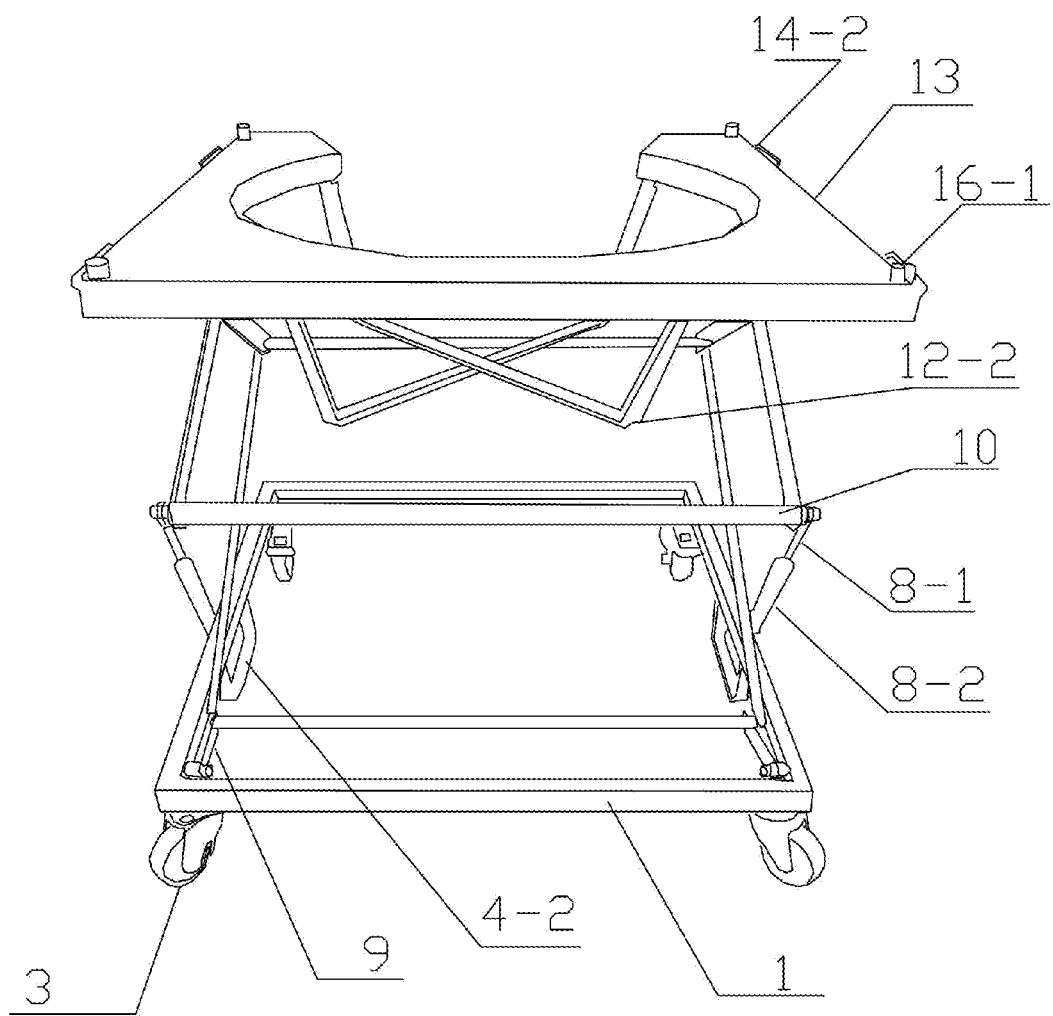
FIG. 6 is a back view after unfolding according to the disclosure.
Figure 7:
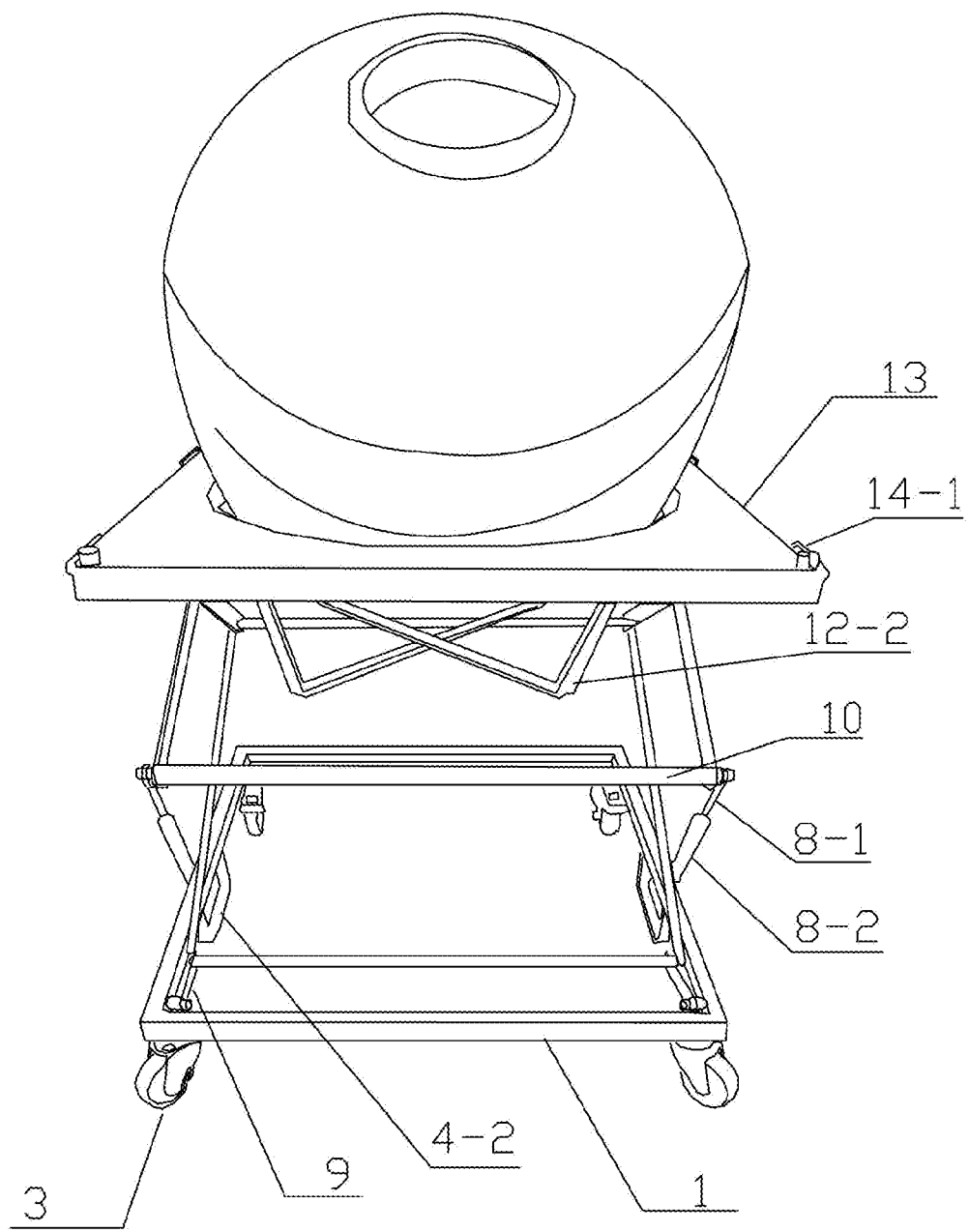
FIG. 7 is a back view when placing an oven body after unfolding according to the disclosure.
Figure 8:
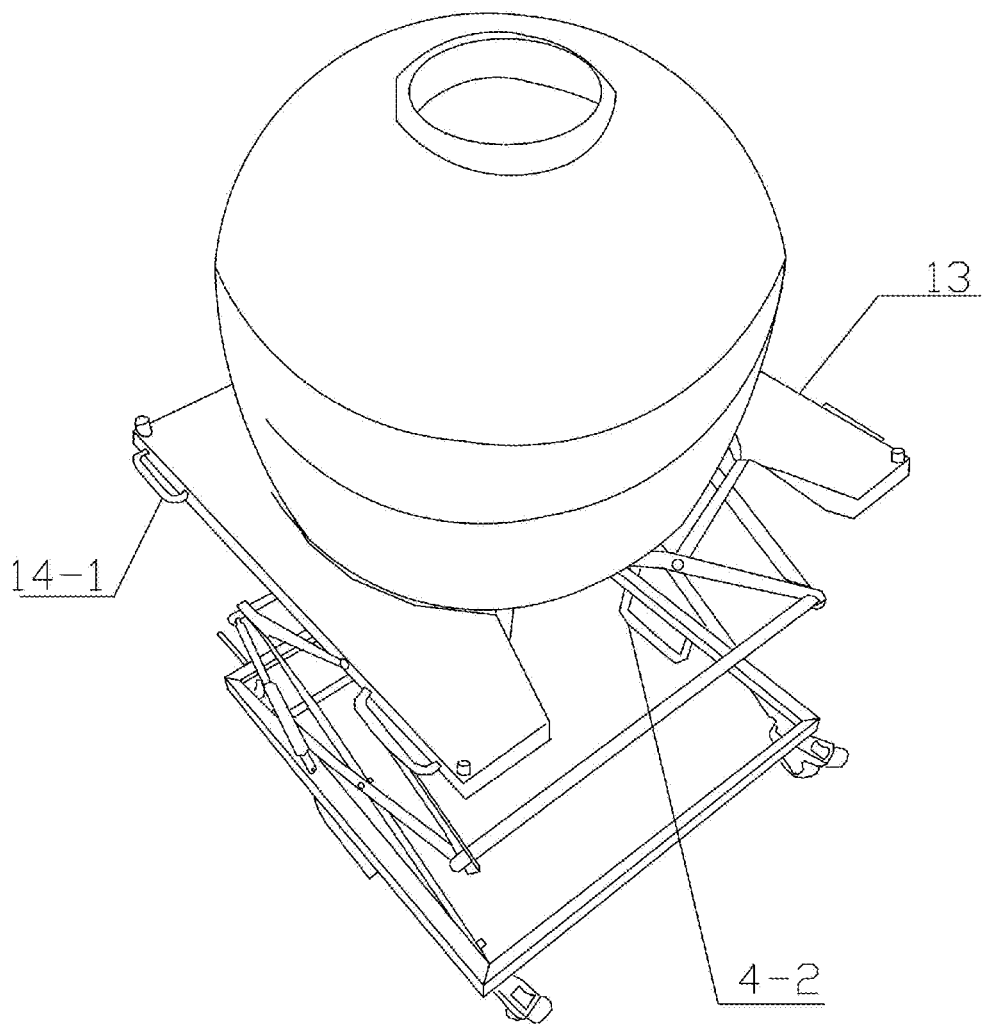
FIG. 8 is a schematic diagram of a stereoscopic structure when placing an oven body after unfolding according to the disclosure.
Figure 9:
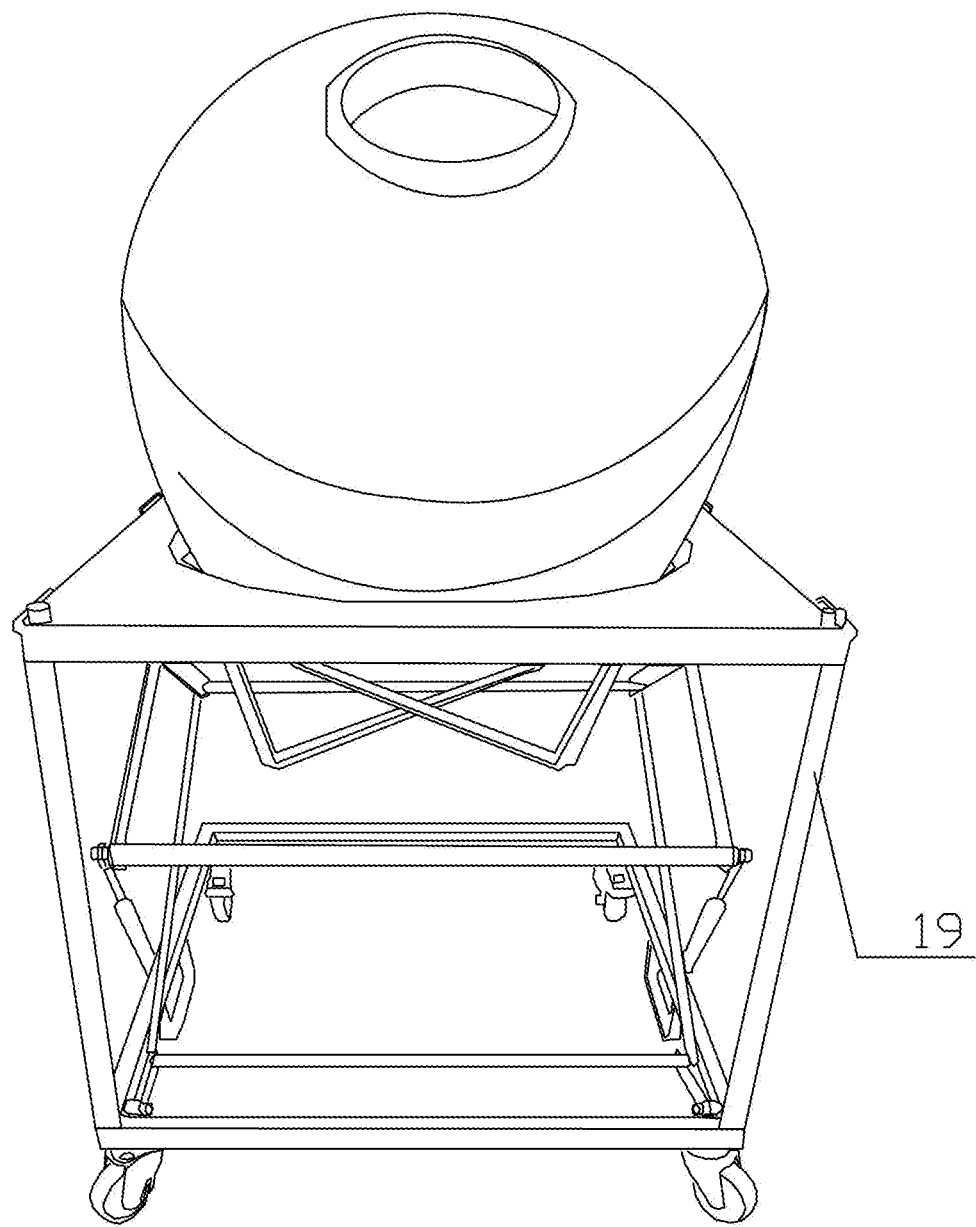
FIG. 9 is a back view after installing reinforcing battens according to the disclosure.
Figure 10:
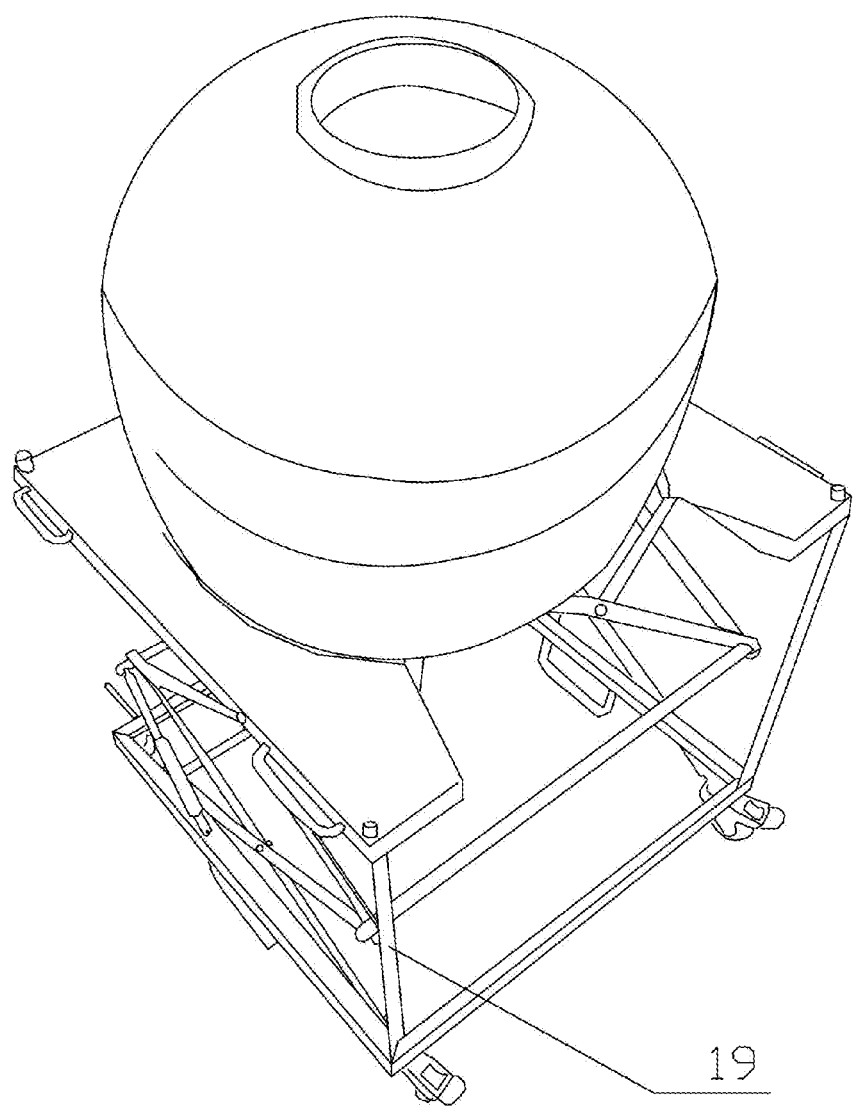
FIG. 10 is a schematic diagram of a stereoscopic structure after installing a reinforcing batten according to the disclosure.
Figure 11:
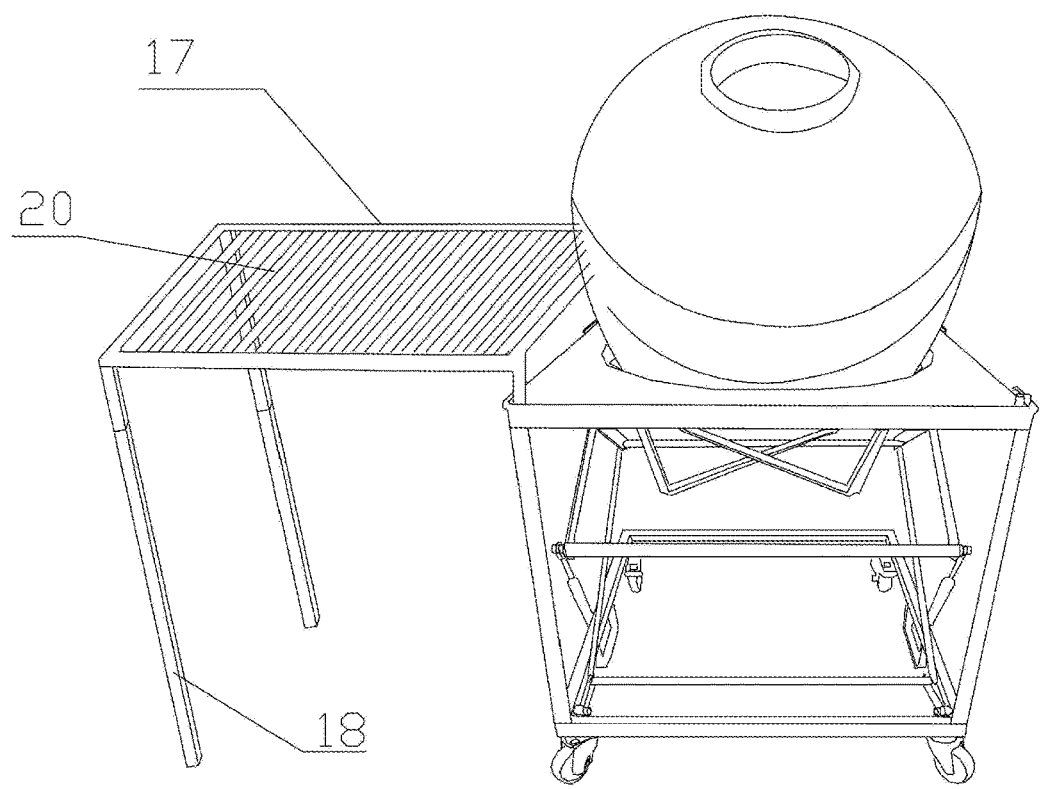
FIG. 11 and FIG. 12 are schematic diagrams for transforming a protective cover into a shelving platform according to the disclosure.
Figure 12:
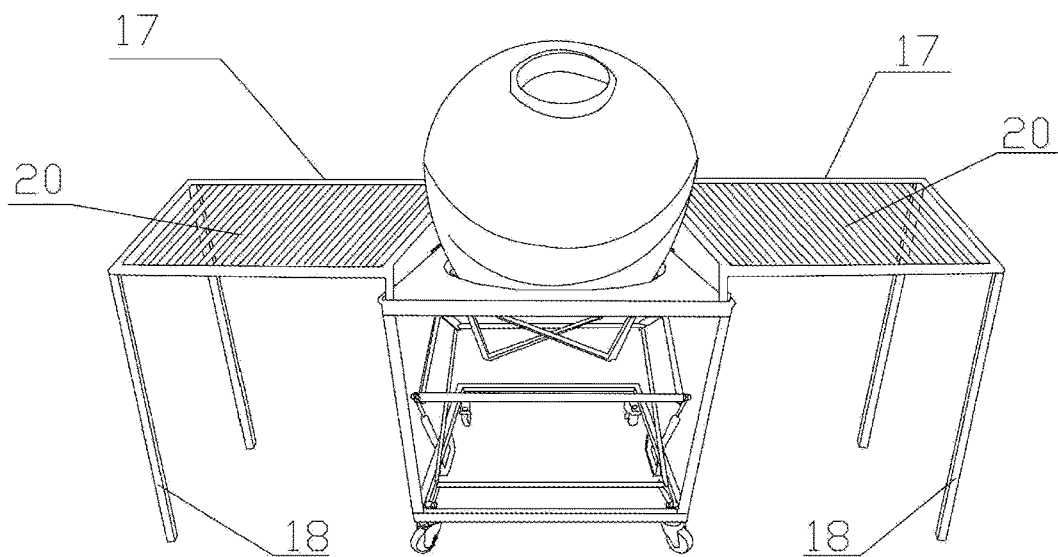
Figure 13:
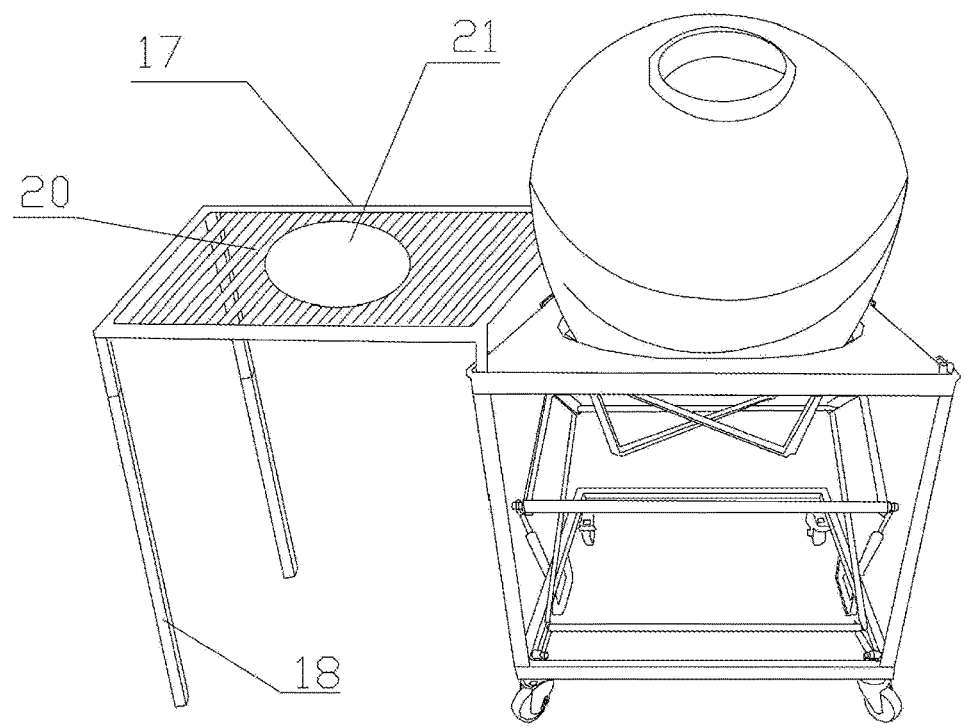
FIG. 13 and FIG. 14 are schematic diagrams for opening a functional groove (21) on a shelving platform according to the disclosure.
Figure 14:
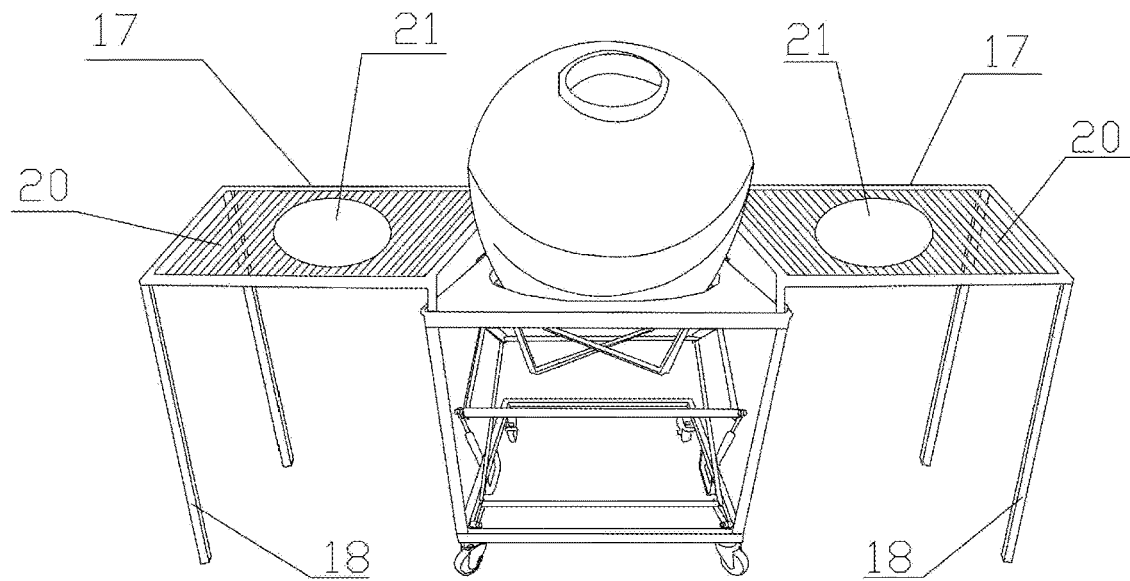

As shown in FIG. 1 to FIG. 14, a multi-functional frame for an oven, comprising: cross beams (1), longitudinal beams (2), a caster (3), a pedal I (4-1), a pedal II (4-2), a diagonal bracing (5), a bolt (6), a connecting piece I (7-1), a connecting piece II (7-2), a hydraulic rod (8-1), a hydraulic cylinder (8-2), a lock rod (9), a connecting rod I (10), a connecting rod II (11), a bracket I (12-1), a bracket II (12-2), a platform (13), a handle I (14-1), a handle I (14-2), a handle II (14-3), a handle IV (14-4), a groove (15), a connecting column I (16-1), a connecting column II (16-2), a connecting column III (16-3), a connecting column IV (16-4), a protective cover (17), a connecting sleeve (18), reinforcing battens (19), a shelving bar (20) and a functional groove (21), wherein the two cross beams (1) and the two longitudinal beams (2) are connected to each other end to end, to form a base frame; the caster (3), the pedal I (4-1) and the pedal II (4-2) are installed at the bottom of the base frame; two cross-linked diagonal bracings (5) are installed at the upper ends of the left and right sides of the base frame and are hinged through the bolt (6); the lock rod (9) is arranged at the rear end of the base frame; one end of the connecting piece I (7-1) and the connecting piece II (7-2) is connected to the diagonal bracing (5) respectively, and the other end thereof is fixed on the platform (13); one end of the hydraulic rod (8-1) is connected to the connecting rod I (10), and the other end thereof is connected to one end of the hydraulic cylinder (8-2), and the other end of the hydraulic cylinder (8-2) is fixed on the base frame; two ends of the connecting rod II (11) are respectively connected to the diagonal bracings (5) at two sides above the base frame; the bracket I (12-1) and the bracket II (12-2) which are cross-linked are installed at the bottom of the platform (13), the handle I (14-1) and the handle I (14-2) are arranged on the left side wall of the platform (13), the handle III (14-3) and the handle IV (14-4) are arranged on the right side wall of the platform (13), the groove (15) is formed at the central position of the platform (13), and the connecting column I (16-1), the connecting column II (16-2), the connecting column III (16-3) and the connecting column IV (16-4) are arranged on the surface of the platform (13); the connecting sleeve (18) is arranged at the bottom of the protective cover (17), and the protective cover (17) is nested above the connecting column I (16-1), the connecting column II (16-2), the connecting column II (16-3) and the connecting column IV (16-4) on the platform (13) through the connecting sleeve (18); the shelving bar (20) is paved place on the top surface of the protective cover (17), and the functional groove (21) is formed on the shelving bar (20); and the upper ends of the four reinforcing battens (19) are fixedly connected to the platform (13), and the lower ends thereof are fixedly connected to the base frame.

Further, the multi-functional frame for the oven mainly comprises a base frame, a platform, a pedal, a handle and a protective cover, wherein the pedal is arranged at the lower end of the base frame, the platform is arranged at the upper end of the base frame, the handle is installed on the side wall plate of the platform, and the protective cover is installed at the upper end of the platform. The multi-functional frame for the oven is reasonable and simple in structure.

Further, the material of the cross beams (1), the longitudinal beams (2), the pedal I (4-1), the pedal II (4-2), the diagonal bracing (5), the bolt (6), the connecting piece I (7-1), the connecting piece II (7-2), the lock rod (9), the connecting rod I (10), the connecting rod II (11), the bracket I (12-1), the bracket II (12-2), the platform (13), the handle I (14-1), the handle II (14-2), the handle III (14-3), the handle IV (14-4), the connecting column I (16-1), the connecting column II (16-2), the connecting column III (16-3), the connecting column IV (16-4), the protective cover (17) and connecting sleeve (18) in the disclosure is iron or stainless steel.

Further, the cross beams (1) and the longitudinal beams (2) in the disclosure are "square tube" shaped or "circular tube" shaped.

Further, the pedal I (4-1) and the pedal II (4-2) in the disclosure are "U" shaped.

Further, the connecting piece I (7-1) and the connecting piece II (7-2) in the disclosure are "Y" shaped.

Further, the platform (13) is "cube" shaped or "cuboid" shaped or "cylinder" shaped.

Further, the handle I (14-1), the handle II (14-2), the handle III (14-3) and the handle IV (14-4) in the disclosure are flat "U" shaped.

Further, the groove (15) in the disclosure is flat "a" shaped.

A use method of the multi-functional frame for the oven comprises the following steps: packaging and transportation, and assembling;

Step I: packaging and transportation

1. Firstly, placing an oven body on the compressed multi-functional frame;
2. Secondly, installing a protective cover on the multi-functional frame after the oven body is placed;
3. Finally, putting the multi-functional frame that the oven body is placed and the protective cover is installed into a packing case, and transporting the same.

Step II: Assembling

1. When using the oven, a user firstly opens the packing case, and takes out the multi-functional frame for placing the oven;
2. Dismounting the protective cover installed on the multi-functional frame;
3. Two persons stand at both sides of the multi-functional frame respectively, wherein one person stamps on the pedal I (4-1) and holds the handle I (14-1) and the handle II (14-2) with both hands respectively, and the other person stamps on the pedal II (14-2) and holds the handle III (14-3) and the handle IV (14-4) with both hands respectively; and the two persons pull multi-functional frame up simultaneously to a maximum height, lock the lock rod (9), and install the reinforcing battens (19).
4. When installing a shelving platform on the right side of the multi-functional frame, the connecting sleeves (18) on two dismounted right legs of the protective cover are taken down respectively, and the two right legs are nested on the connecting column I (16-1) and the connecting column II (16-2) respectively; if the user wants to install the shelving platform on the left side of the multi-functional frame, similarly, the connecting sleeves (18) on two dismounted left legs of the protective cover are taken down respectively, and the two left legs are nested on the connecting column III (16-3) and the connecting column IV (16-4) respectively; and if the user wants to install the shelving platform on the two sides of the multi-functional frame, the user only needs the manufacturer to prepare one more protective cover when purchasing the oven. Users who have purchased the oven separately in advance, now, only need to separately purchase the multi-functional frame which is also applicable to the oven, and when purchasing, the users only need to inform the manufacturer of size parameters of multi-functional frame series.
5. After the shelving bar is placed on the shelving platform, dishes to be baked can be placed on the shelving platform. If the user wants to place a small oven or other commodities on the shelving platform, the user only needs the manufacturer to open the functional groove (21) on the shelving bar when purchasing the multi-functional frame.

The disclosure has the following advantages when compared with traditional similar commodities:

1. Attributed to the use of the protective cover, the filler used in the packing case when packaging is substantially reduced, and the packaging and transportation costs are greatly saved;
2. Attributed to the use of the protective cover, the damage of the oven in transit due to the misuse of the filler is avoided;
3. The assembly of the oven by the user when use is facilitated, and meanwhile, a lot of assembly times of the oven are saved, and a lot of manpower and material resources are saved, thereby really achieving the purpose of worry-saving installation and rapid assembly for the user.
4. The protective cover can be transformed into the shelving platform when assembling the multi-functional frame, thereby achieving the diversity of the function.

The embodiment has beneficial effects that:

The multi-functional frame for the oven of the embodiment has characteristics of low packaging and transportation costs, convenient and easy use and assembly for a user, and time saving, labor saving and worry saving when use.

The disclosure has described through the embodiments, but it should be understood that, the embodiments are only for illustrating and explaining, rather than limiting the disclosure in the described scope of the embodiment. In addition, those skilled in the art can understand that, the disclosure is not limited to the embodiments, and more variations and modifications can also be made according to an instruction of the disclosure, which are within the scope claimed by the disclosure. The protection scope of the disclosure is defined by attached claims and equivalent scope thereof.

The invention claimed is:

1. A multi-functional frame for an oven, comprising: cross beams (1), longitudinal beams (2), a caster (3), a pedal I (4-1), a pedal II (4-2), a diagonal bracing (5), a bolt (6), a connecting piece I (7-1), a connecting piece II (7-2), a hydraulic rod (8-1), a hydraulic cylinder (8-2), a lock rod (9), a connecting rod I (10), a connecting rod II (11), a bracket I (12-1), a bracket II (12-2), a platform (13), a handle I (14-1), a handle II (14-2), a handle III (14-3), a handle IV (14-4), a groove (15), a connecting column I (16-1), a connecting column I (16-2), a connecting column II (16-3), a connecting column IV (16-4), a protective cover (17), a connecting sleeve (18), reinforcing battens (19), a shelving bar (20) and a functional groove (21), wherein the two cross beams (1) and the two longitudinal beams (2) are connected to each other end to end, to form a base frame; the caster (3), the pedal I (4-1) and the pedal II (4-2) are installed at the bottom of the base frame; two cross-linked diagonal bracings (5) are installed at the upper ends of the left and right sides of the base frame and are hinged through the bolt (6); the lock rod (9) is arranged at the rear end of the base frame; one end of the connecting piece I (7-1) and the connecting piece II (7-2) is connected to the diagonal bracing (5) respectively, and the other end thereof is fixed on the platform (13); one end of the hydraulic rod (8-1) is connected to the connecting rod I (10), and the other end thereof is connected to one end of the hydraulic cylinder (8-2), and the other end of the hydraulic cylinder (8-2) is fixed on the base frame; two ends of the connecting rod II (11) are respectively connected to the diagonal bracings (5) at two sides above the base frame; the bracket I (12-1) and the bracket II (12-2) which are cross-linked are installed at the bottom of the platform (13), the handle I (14-1) and the handle II (14-2) are arranged on the left side wall of the platform (13), the handle III (14-3) and the handle IV (14-4) are arranged on the right side wall of the platform (13), the groove (15) is formed at the central position of the platform (13), and the connecting column I (16-1), the connecting column II (16-2), the connecting column III (16-3) and the connecting column IV (16-4) are arranged on the surface of the platform (13); the connecting sleeve (18) is arranged at the bottom of the protective cover (17), and the protective cover (17) is nested above the connecting column I (16-1), the connecting column II (16-2), the connecting column III (16-3) and the connecting column IV (16-4) on the platform (13) through the connecting sleeve (18); the shelving bar (20) is placed on the top surface of the protective cover (17), and the functional groove (21) is formed on the shelving bar (20); and the upper ends of the four reinforcing battens (19) are fixedly connected to the platform (13), and the lower ends thereof are fixedly connected to the base frame.

2. The multi-functional frame for the oven according to claim 1, wherein the material of the cross beams (1), the longitudinal beams (2), the pedal I (4-1), the pedal II (4-2), the diagonal bracing (5), the bolt (6), the connecting piece I (7-1), the connecting piece II (7-2), the lock rod (9), the connecting rod I (10), the connecting rod II (11), the bracket I (12-1), the bracket II (12-2), the platform (13), the handle I (14-1), the handle II (14.2), the handle II (14-3), the handle IV (14-4), the connecting column I (16-1), the connecting column II (16-2), the connecting column III (16-3), the connecting column IV (16-4), the protective cover (17) and connecting sleeve (18) is iron or stainless steel.

3. The multi-functional frame for the oven according to claim 1, wherein the cross beams (1) and the longitudinal beams (2) are "square tube" shaped or "circular tube" shaped.

4. The multi-functional frame for the oven according to claim 1, wherein the pedal I (4-1) and the pedal II (4-2) are "U" shaped.

5. The multi-functional frame for the oven according to claim 1, wherein the connecting piece I (7-1) and the connecting piece II (7-2) are "Y" shaped.

6. The multi-functional frame for the oven according to claim 1, wherein the platform (13) is "cube" shaped or "cuboid" shaped or "cylinder" shaped.

7. The multi-functional frame for the oven according to claim 1, wherein the handle I (14-1), the handle II (14-2), the handle III (14-3) and the handle IV (14-4) are flat "U" shaped.

8. The multi-functional frame for the oven according to claim 1, wherein the groove (15) is flat "Ω" shaped.

* * * * *